US011216001B2

(12) United States Patent
Misu et al.

(10) Patent No.: US 11,216,001 B2
(45) Date of Patent: Jan. 4, 2022

(54) SYSTEM AND METHOD FOR OUTPUTTING VEHICLE DYNAMIC CONTROLS USING DEEP NEURAL NETWORKS

(71) Applicant: Honda Motor Co., Ltd., Tokyo (JP)

(72) Inventors: Teruhisa Misu, Mountain View, CA (US); Ashish Tawari, Santa Clara, CA (US); Sujitha Catherine Martin, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 16/359,271

(22) Filed: Mar. 20, 2019

(65) Prior Publication Data

US 2020/0301437 A1  Sep. 24, 2020

(51) Int. Cl.
  *G05D 1/02* (2020.01)
  *G05D 1/00* (2006.01)
  (Continued)

(52) U.S. Cl.
  CPC .......... *G05D 1/0221* (2013.01); *B60W 10/18* (2013.01); *B60W 10/20* (2013.01); *G05D 1/0088* (2013.01);
  (Continued)

(58) Field of Classification Search
  CPC ......... G05D 2201/0213; G05D 1/0088; G05D 1/024; G05D 1/0257; G05D 1/0221; G05D 3/00; G05D 1/00; G05D 1/0027; G05D 1/0033; G05D 1/0044; G05D 1/02; G05D 1/021; G05D 1/0212; G05D 1/0214; G05D 1/0223; G05D 1/0231; G05D 1/0246; G05D 1/0253; G05D 1/0278; G06N 3/0454; G06N 3/08; G06N 3/00; G06N 3/02; G06N 3/04; G06N 3/06; G06N 3/082; G05B 13/027; G05B 2219/00; G05B 2219/25255; G05B 2219/40494; G05B 2219/41054; G05B 23/00; G05B 23/024; G05B 23/0254;
  (Continued)

(56) References Cited

U.S. PATENT DOCUMENTS 8,825,350 B1   9/2014  Robinson
10,013,773 B1 *  7/2018  Ogale ...................... G06N 3/08
  (Continued)

FOREIGN PATENT DOCUMENTS

WO  WO2017120336  7/2017
WO  WO2017189859  11/2017

*Primary Examiner* — Anthony R Jimenez
(74) *Attorney, Agent, or Firm* — Rankin, Hill & Clark LLP

(57) ABSTRACT

A system and method for outputting vehicle dynamic controls using deep neural networks that include receiving environmental sensor data from at least one sensor of a vehicle of a surrounding environment of the vehicle. The system and method also include inputting the environmental sensor data to a primary deep neural network structure and inputting intermediate representation, at least one applicable traffic rule, and at least one applicable vehicle maneuver to a secondary deep neural network structure. The system and method further include outputting vehicle dynamic controls to autonomously control the vehicle to navigate within the surrounding environment of the vehicle based on the at least one applicable traffic rule and the at least one applicable vehicle maneuver.

20 Claims, 6 Drawing Sheets

(51) Int. Cl.
*B60W 10/18* (2012.01)
*G06N 3/08* (2006.01)
*G06N 3/04* (2006.01)
*B60W 10/20* (2006.01)

(52) U.S. Cl.
CPC ........... *G05D 1/024* (2013.01); *G05D 1/0257* (2013.01); *G06N 3/0454* (2013.01); *G06N 3/08* (2013.01); *B60W 2420/52* (2013.01); *B60W 2555/60* (2020.02); *G05D 2201/0213* (2013.01)

(58) Field of Classification Search
CPC .............. G05B 23/0281; G05B 13/00; G05B 13/0265; G05B 13/029; G05B 13/04; B60W 10/00; B60W 10/18; B60W 10/20; B60W 2420/52; B60W 2555/60; B60W 10/02
USPC .......................................................... 701/23
See application file for complete search history.

(56) References Cited

U.S. PATENT DOCUMENTS

| | | | |
|---|---|---|---|
| 10,034,630 | B2 | 7/2018 | Lee et al. |
| 10,106,153 | B1* | 10/2018 | Xiao ...................... B60W 30/00 |
| 10,719,301 | B1* | 7/2020 | Dasgupta .................. G06F 8/33 |
| 2017/0024643 | A1 | 1/2017 | Lillicrap et al. |
| 2018/0107215 | A1 | 4/2018 | Djuric et al. |
| 2018/0157972 | A1 | 6/2018 | Hu et al. |
| 2018/0232585 | A1 | 8/2018 | Kim |
| 2018/0247160 | A1 | 8/2018 | Rohani et al. |
| 2018/0275657 | A1 | 9/2018 | You |
| 2018/0292825 | A1 | 10/2018 | Smolyanskiy et al. |
| 2018/0299841 | A1 | 10/2018 | Appu et al. |
| 2019/0005386 | A1 | 1/2019 | Chen et al. |
| 2019/0370647 | A1* | 12/2019 | Doshi ....................... G06N 3/08 |
| 2020/0189603 | A1* | 6/2020 | Yeh ......................... G06N 5/045 |

* cited by examiner

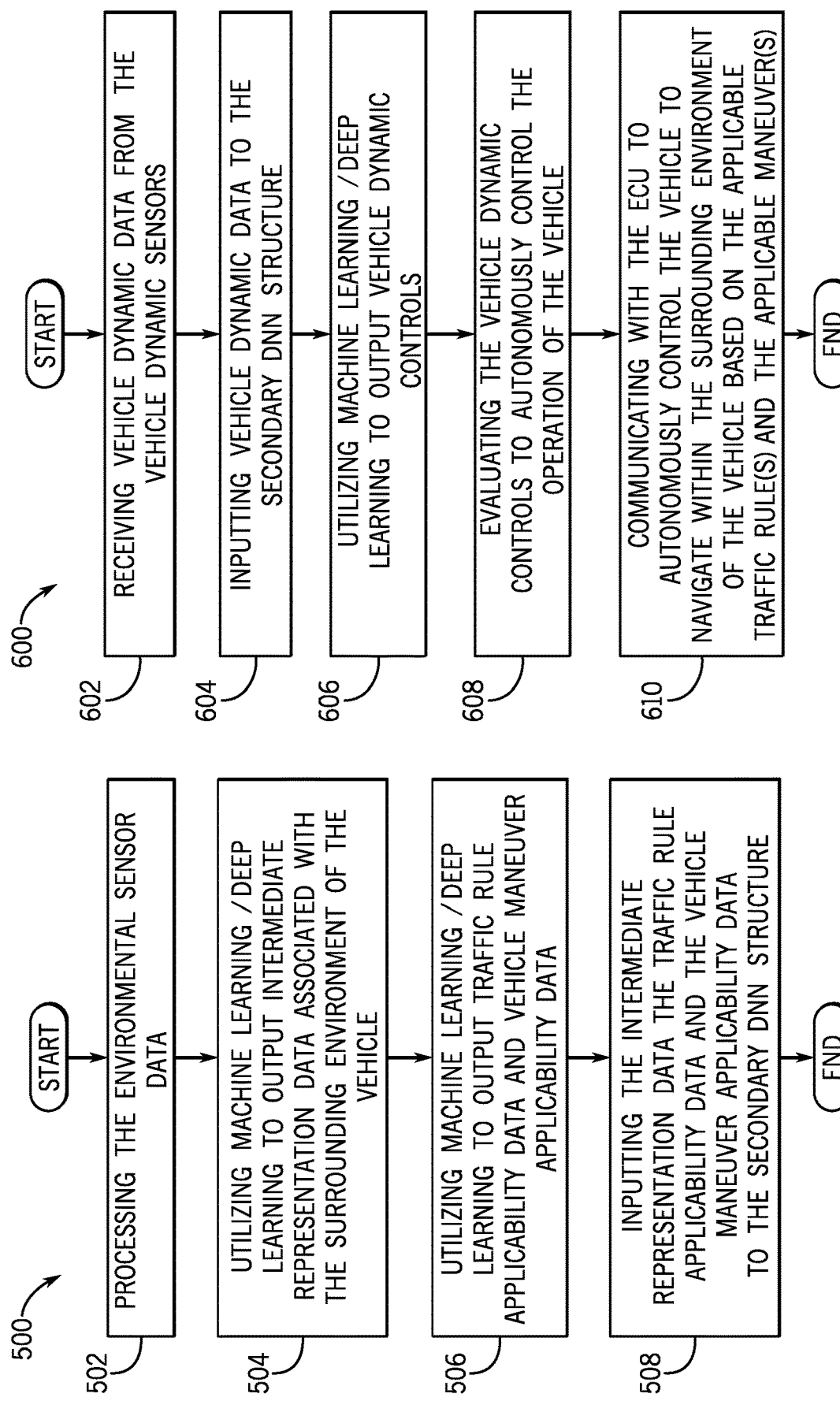

SYSTEM AND METHOD FOR OUTPUTTING VEHICLE DYNAMIC CONTROLS USING DEEP NEURAL NETWORKS

BACKGROUND

In many circumstances autonomous driving systems evaluate data provided by vehicle sensors to determine driving controls. However, such controls may be based on a reaction to objects detected by the sensors and may not apply logic as to why and what types of particular driving controls should be implemented. For example, data provided by cameras may be utilized to autonomously control a vehicle to avoid any contact with other vehicles or objects. However, such data may not be evaluated by applying any logic that may apply additional determinations with respect to the type of driving controls that should be implemented. Additionally, in many circumstances when driving controls are implemented based solely on data provided by sensors, it is not possible to truly determine why the vehicle may be controlled in a certain manner, as logic was not utilized to understand why and what particular types of driving maneuvers may be implemented.

BRIEF DESCRIPTION

According to one aspect, a computer-implemented method for outputting vehicle dynamic controls using deep neural networks that includes receiving environmental sensor data from at least one sensor of a vehicle of a surrounding environment of the vehicle. The computer-implemented method also includes inputting the environmental sensor data to a primary deep neural network structure (primary DNN structure). The primary DNN structure outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle. The computer-implemented method further includes inputting the intermediate representation, the at least one applicable traffic rule, and the at least one applicable vehicle maneuver to a secondary deep neural network structure (secondary DNN structure) and outputting vehicle dynamic controls to autonomously control the vehicle to navigate within the surrounding environment of the vehicle based on the at least one applicable traffic rule and the at least one applicable vehicle maneuver.

According to another aspect, a system for outputting vehicle dynamic controls using deep neural networks that includes a memory storing instructions when executed by a processor cause the processor to receive environmental sensor data from at least one sensor of a vehicle of a surrounding environment of the vehicle. The instructions also cause the processor to input the environmental sensor data to a primary deep neural network structure (primary DNN structure). The primary DNN structure outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle. The instructions additionally cause the processor to input the intermediate representation, the at least one applicable traffic rule, and the at least one applicable vehicle maneuver to a secondary deep neural network structure (secondary DNN structure) and output vehicle dynamic controls to autonomously control the vehicle to navigate within the surrounding environment of the vehicle based on the at least one applicable traffic rule and the at least one applicable vehicle maneuver.

According to yet another aspect, a non-transitory computer readable storage medium storing instructions that when executed by a computer, which includes a processor perform a method, the method includes receiving environmental sensor data from at least one sensor of a vehicle of a surrounding environment of the vehicle. The method also includes inputting the environmental sensor data to a primary deep neural network structure (primary DNN structure). The primary DNN structure outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle. The method further includes inputting the intermediate representation, the at least one applicable traffic rule, and the at least one applicable vehicle maneuver to a secondary deep neural network structure (secondary DNN structure) and outputting vehicle dynamic controls to autonomously control the vehicle to navigate within the surrounding environment of the vehicle based on the at least one applicable traffic rule and the at least one applicable vehicle maneuver.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 5 is a process flow diagram of a method for inputting the environmental sensor data to a primary deep neural network structure and outputting at least one applicable traffic rule and at least one applicable vehicle maneuver that may be followed while navigating within the surrounding environment of the vehicle according to an exemplary embodiment of the present disclosure;

FIG. 6 is a process flow diagram for inputting the intermediate representation, at least one applicable traffic rule, and at least one applicable vehicle maneuver to the secondary deep neural network structure and outputting vehicle dynamic controls to autonomously control the vehicle according to an exemplary embodiment of the present disclosure.

DETAILED DESCRIPTION

Figure 1:
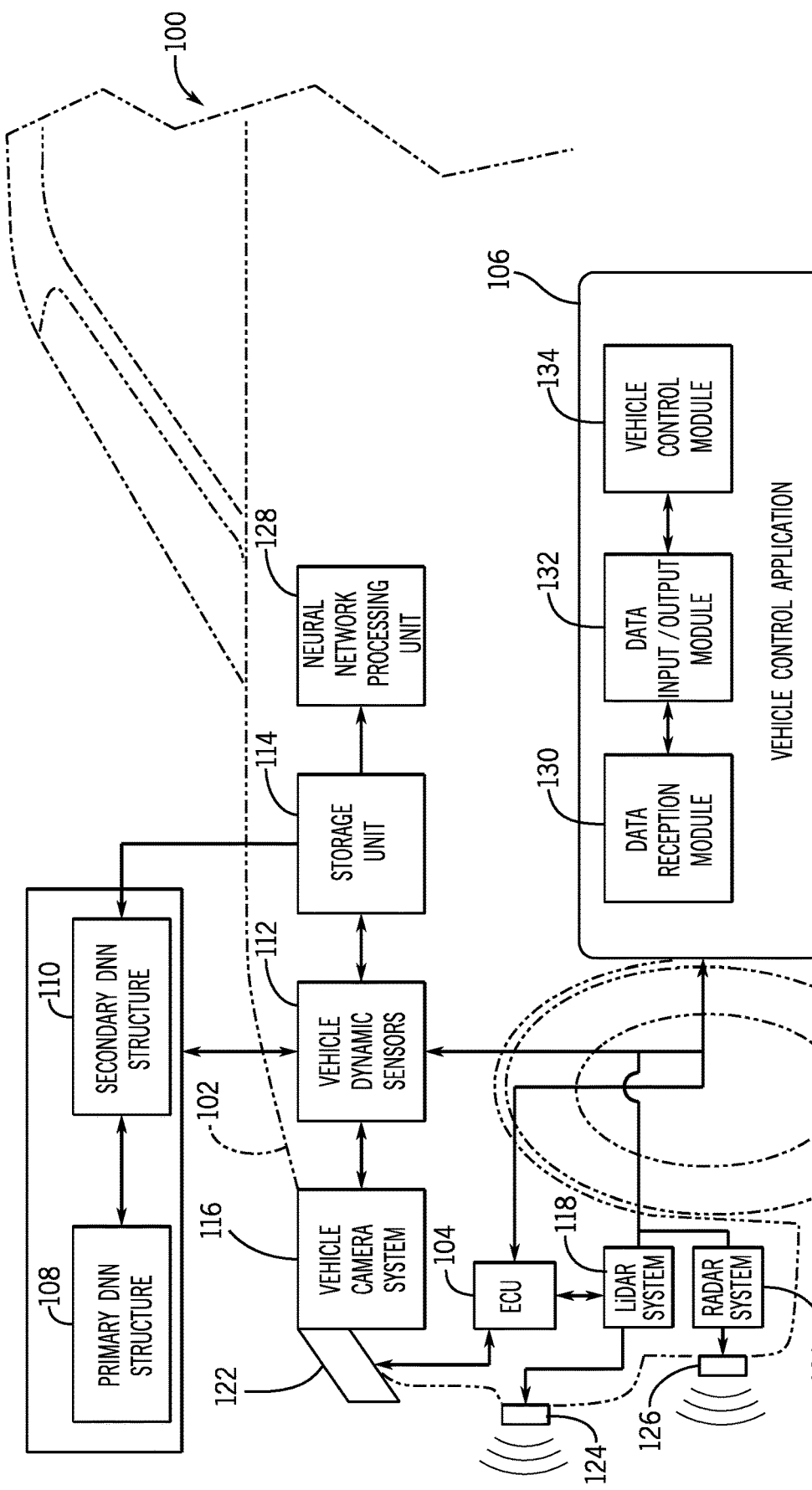
FIG. 1 is a schematic view of an exemplary system for outputting vehicle dynamic controls using deep neural networks according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but is not limited to, any automatic or manual systems that can be used to enhance the vehicle, driving and/or safety. A "vehicle system", as used herein can include, but is not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more embodiments and not for purposes of limiting the same, FIG. 1 is a schematic view of an exemplary system 100 for outputting vehicle dynamic controls using deep neural networks according to an exemplary embodiment of the present disclosure. The components of the system 100, as well as the components of other systems, hardware architectures, and software architectures discussed herein, can be combined, omitted, or organized into different architectures for various embodiments.

Generally the system 100 includes a vehicle 102 with an electronic control unit (ECU) 104 that executes one or more applications, operating systems, vehicle system and subsystem user interfaces, among others. In an exemplary embodiment, the ECU 104 may be configured to execute a vehicle control application 106 that may be configured to receive sensor data from one or more sensors of the vehicle 102 (discussed below) and may utilize one or more deep neural networks that are part of a primary level structure of one or more deep neural networks (primary DNN structure) 108 and part of a secondary level structure of one or more deep neural networks (secondary DNN structure) 110 that may be configured to utilize machine learning/deep learning processes to analyze inputs with respect to pre-trained datasets and output instructions.

As discussed in more detail below, the primary DNN structure 108 may include one or more deep neural networks (DNNs) that may utilize pre-trained environmental sensor logic to determine one or more attributes of a surrounding environment of the vehicle 102 based on sensor data that is input to the primary DNN structure 108 by the vehicle control application 106. In an exemplary embodiment, the surrounding environment of the vehicle 102 may be defined as a predetermined area located in around (front/sides/behind) the vehicle 102 (e.g., road environment in front, sides, and/or behind the vehicle 102) that may be included within the vehicle's travel path. For example, the surrounding environment of the vehicle 102 may include a traffic intersection that the vehicle 102 may be driving through and/or stopped at as the vehicle 102 is traveling on a roadway of the traffic intersection.

As discussed in more detail below, the primary DNN structure 108 may be configured to output an intermediate representation (e.g., scene graph) of the surrounding environment of the vehicle 102. The intermediate representation may include a data representation of the surrounding environment of the vehicle 102 that pertains to a position and a location of the vehicle 102 with respect to one or more traffic participants (e.g., pedestrians, bikers, other vehicles), roadway attributes (e.g., lane markings, off-ramps, curbs), and road side objects (e.g., traffic light, stop sign) located within the surrounding environment of the vehicle 102.

The primary DNN structure 108 may specifically utilize a pre-trained dataset of traffic rules that may be utilized to control the vehicle 102 to be operating in accordance with. Additionally, the primary DNN structure 108 may also utilized a pre-trained dataset of vehicle maneuver guidelines that may be utilized to control the vehicle 102 to be operating in accordance with. Accordingly, based on the analysis of the intermediate representation, the primary DNN structure 108 may output one or more traffic rules and one or more vehicle maneuvers that may be followed with respect to the vehicle 102 navigating within the surrounding environment of the vehicle 102.

As discussed in more detail below, the vehicle control application 106 may additionally be configured to input the intermediate representation of the surrounding environment of the vehicle 102 in addition to one or more applicable traffic rules and one or more applicable vehicle maneuvers output by the primary DNN structure 108 to the secondary DNN structure 110. The vehicle control application 106 may also be configured to input sensor data that is provided by vehicle dynamic sensors 112 of the vehicle 102 to the secondary DNN structure 110. The secondary DNN structure 110 may include one or more separate DNNs that may be configured to utilize machine learning/deep learning to process inputs received from the vehicle control application 106 with respect to a pre-trained dynamic control dataset to output vehicle control commands to the application 106.

In particular, the DNN(s) of the secondary DNN structure 110 may be configured to utilize machine learning/deep learning processes to analyze the intermediate representation, traffic rule applicability data, vehicle maneuver applicability data, and the vehicle dynamic data with respect to the pre-trained dynamic control data to output one or more specific vehicle dynamic controls that allow the vehicle 102 to be operated to abide by the one or more applicable pre-trained traffic rules and one or more applicable pre-trained vehicle maneuver guidelines. This functionality may allow the vehicle control application 106 to autonomously control the vehicle 102 to navigate within the surrounding environment of the vehicle 102 in a safe and efficient manner. As discussed, the vehicle control application 106 may also enable a log of decisions to be updated and stored that may provide an explainable model as to logic utilized to autonomously control the vehicle 102.

With continued reference to FIG. 1, the ECU 104 of the vehicle 102 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102. The ECU 104 may also include a communication device (not shown) for sending data internally in the vehicle 102 and communicating with externally hosted computing systems (e.g., external to the vehicle 102). Generally, the ECU 104 may communicate with a storage unit 114 to execute the one or more applications, operating systems, vehicle systems and subsystem user interfaces, and the like that are stored on the storage unit 114.

In one embodiment, the storage unit 114 of the vehicle 102 may be configured to store one or more executable files associated with one or more operating systems, applications, associated operating system data, application data, vehicle system and subsystem user interface data, and the like that are executed by the ECU 104. In one or more embodiments, the storage unit 114 of the vehicle 102 may be accessed by the vehicle control application 106 to store data, for example, one or more images, videos, and/or vehicle dynamic data associated with the vehicle 102.

In one embodiment, the ECU 104 may be configured to operably control a plurality of components of the vehicle 102 that are operably connected to the ECU 104. The ECU 104 may also be configured to provide one or more commands to one or more control units (not shown) of the vehicle 102, including, but not limited to an acceleration control unit, a transmission control unit, a braking control unit, a steering control unit, an engine control unit, and the like to control the vehicle 102 to be autonomously driven. As discussed below, the ECU 104 may be configured to receive data communicated by the vehicle control application 106 that may be associated with one or more specific vehicle dynamic controls that may be output by the secondary DNN structure 110 to thereby provide one or more commands to the one or more control units to autonomously control operation of the vehicle 102 to navigate in a safe and efficient manner within the surrounding environment of the vehicle 102.

In one or more embodiments, the autonomous control of the vehicle 102 may be provided to partially control operation of the vehicle 102 during one or more circumstances (e.g., safety controls, driver assist controls), and/or fully to control operation of the vehicle 102 during an entire trip of the vehicle 102 (e.g., fully autonomous driving of the vehicle 102). In some embodiments, the vehicle control application 106 may communicate with the ECU 104 to control the vehicle 102 to be autonomously driven in one or more similar traffic scenarios that are similar to a real-time scenario occurring within the surrounding environment of the vehicle 102 based on one or more vehicle control commands that may be output by the secondary DNN structure 110.

In one embodiment, the ECU 104 may additionally be operably connected to environmental sensor systems of the vehicle 102 that may include, but may not be limited to a vehicle camera system 116, a LiDAR system 118, and a radar system 120 that may provide respective environmental sensor data to the vehicle control application 106. It is to be appreciated that the vehicle 102 may include additional contemplated environmental sensors that may not be shown in FIG. 1 and/or described herein and that those additional systems may provide environmental sensor data to the vehicle control application 106 to be further inputted to the primary DNN structure 108.

In an exemplary embodiment, the vehicle camera system 116 may include one or more cameras 122 that are positioned at one or more exterior portions of the vehicle 102. The camera(s) 122 may be positioned in a direction to capture the surrounding environment of the vehicle 102. In particular, the one or more cameras 122 of the vehicle camera system 116 may be disposed at external front and/or side portions of the vehicle 102, including, but not limited to different portions of the vehicle bumper, vehicle front lighting units, vehicle fenders, and the windshield.

The one or more cameras 122 may be positioned on a planar sweep pedestal (not shown) that allows the one or more cameras to be oscillated to capture images of the surrounding environment of the vehicle 102 at various angles. In one configuration, the one or more cameras 122 of the vehicle camera system 116 may be positioned to capture images/video of an environment that may surround the vehicle's travel path (e.g., road environment in front, sides, and/or behind the vehicle 102).

In some configurations, the one or more cameras 122 of the vehicle camera system 116 may additionally be disposed at one or more internal portions of the vehicle 102 that may allow the camera(s) 122 to capture images/video of the surrounding environment of the vehicle 102. For example, the one or more cameras 122 may be disposed at internal portions of the vehicle 102 including the vehicle dash board (e.g., dash mounted camera), rear side of a vehicle rear view mirror, etc. In some embodiments, one or more cameras 122 may be disposed within external portions of the vehicle 102 and may be oscillated to capture images/video of events and/or objects that may be initially captured by one or more cameras 122 disposed within the internal portions of the vehicle 102.

In an exemplary embodiment, the one or more cameras 122 of the vehicle camera system 116 may provide untrimmed images/video of the surrounding environment of the vehicle 102. In one embodiment, the vehicle camera system 116 may be configured to electronically convert the images/video into image data that may include one or more attributes including one or more sets of image coordinates that may be associated with one or more traffic participants (e.g., pedestrians, bikers, other vehicles), one or more roadway attributes (e.g., lane markings, off-ramps, curbs), and one or more road side objects (e.g., traffic light, stop sign) located within the surrounding environment of the vehicle 102.

In some embodiments, if more than one camera 122 provides images/video of the surrounding environment of the vehicle 102, the vehicle camera system 116 may be configured to aggregate the images/video into the image data that includes one or more sets of image coordinates that may be associated with a position and location of one or more attributes that are located within the surrounding environment of the vehicle 102 with respect to the vehicle 102. As discussed below, the primary DNN structure 108 may utilize a pre-trained environmental sensor dataset (shown in FIG. 3) that may include image logic to analyze the one or more sets of image coordinates to output an intermediate representation of the surrounding environment of the vehicle 102.

In one or more embodiments, the LiDAR system 118 of the vehicle 102 may include one or more LiDAR transceivers 124. The one or more LiDAR transceivers 124 of the LiDAR system 118 may be disposed at external front and/or side portions of the vehicle 102, including, but not limited to different portions of the vehicle bumper, vehicle front lighting units, vehicle fenders, and the windshield. Additionally or alternatively, the one or more LiDAR transceivers 124 of the LiDAR system 118 may be disposed at internal positions of the vehicle 102 including the vehicle dashboard (e.g., dash mounted camera), rear side of a vehicle rear view mirror, etc.

The one or more LiDAR transceivers 124 may include one or more planar sweep lasers that may include respective three-dimensional LiDAR sensors that may be configured to oscillate and emit one or more laser beams of ultraviolet, visible, or near infrared light toward the surrounding environment of the vehicle 102. The one or more LiDAR transceivers 124 may be configured to receive one or more reflected laser waves (e.g., signals) that are reflected off one or more traffic participants, one or more roadway attributes, and/or one or more road side objects located within the surrounding environment of the vehicle 102.

In an exemplary embodiment, the one or more LiDAR transceivers 124 of the LiDAR system 118 may provide data associated with reflected laser beam measurements (e.g., depth, range, strength, direction, position) to the LiDAR system 118. In one embodiment, the LiDAR system 118 may be configured to electronically convert the reflected laser beam measurements into LiDAR data. The LiDAR data may include one or more sets of LiDAR coordinates (e.g., local coordinates, geographic coordinates, depth coordinates (latitude, longitude, ellipsoid height), or geocentric coordinates (x,y,z, coordinates)) based on the reception of one or more reflected laser waves by the LiDAR transceiver(s) 124. For example, the LiDAR data may include one or more sets of LiDAR coordinates that may be associated with one or more the reflected LiDAR laser beam measurements of LiDAR waves that are reflected off of traffic participants (other vehicles) and roadway attributes (guard rails) that are located within the surrounding environment of the vehicle 102.

In some embodiments, if more than one LiDAR transceiver 124 provides one or more the reflected LiDAR laser beam measurements, the LiDAR system 118 may be configured to aggregate the reflected LiDAR laser beam measurements provided by various LiDAR transceivers 124 into the LiDAR data. The LiDAR data may include one or more sets of LiDAR coordinates that may be associated with a position, location, and depth of one or more traffic participants, one or more roadway attributes, and/or one or more road side objects located within the surrounding environment of the vehicle 102. As discussed below, the primary DNN structure 108 may utilize the pre-trained environmental sensor dataset that may include LiDAR logic to analyze the one or more sets of LiDAR coordinates to output an intermediate representation of the surrounding environment of the vehicle 102.

In one or more embodiments, the radar system 120 of the vehicle 102 may include one or more radar transceivers 126. The one or more radar transceivers 126 of the radar system 120 may be disposed at external front and/or side portions of the vehicle 102, including, but not limited to different portions of the vehicle bumper, vehicle front lighting units, vehicle fenders, and the windshield. The one or more radar transceivers 126 may include one or more planar sweep radar transceivers that may be configured to oscillate and emit one or more radar waves toward the surrounding environment of the vehicle 102. The one or more radar transceivers 126 may be configured to receive one or more reflected radar waves (e.g., signals) that are reflected off of traffic participants (e.g., pedestrians, bikers, other vehicles), roadway attributes (e.g., guard-rails, off-ramps, curbs), and road side objects (e.g., traffic light, stop sign).

In an exemplary embodiment, the radar transceivers 126 of the radar system 120 may provide data associated with reflected radar wave measurements (e.g., range, strength, direction, position) to the radar system 120. In one embodiment, the radar system 120 may be configured to convert the radar wave measurements into radar data that may include one or more sets of radar coordinates (e.g., local coordinates, geographic coordinates (latitude, longitude, ellipsoid height), or geocentric coordinates (x,y,z, coordinates)) that may be associated with one or more the reflected radar wave measurements that are reflected off of traffic participants, roadway attributes, and road side objects.

In some embodiments, if more than one radar transceiver 126 provides one or more the reflected radar laser beam measurements, the radar system 120 may be configured to aggregate the reflected radar laser beam measurements provided by various radar transceivers 126 into the radar data that includes one or more sets of radar coordinates that may be associated with a position and location of traffic participants, roadway attributes, and road side objects that are located within the surrounding environment of the vehicle 102. As discussed below, the primary DNN structure 108 may utilize the pre-trained environmental sensor dataset that may include radar logic to analyze the one or more sets of radar coordinates to output an intermediate representation of the surrounding environment of the vehicle 102.

In an exemplary embodiment, the vehicle dynamic sensors 112 of the vehicle 102 may also be operably connected to the ECU 104 to receive inputs from one or more vehicle systems, sub-systems, control systems, and the like. In one embodiment, the vehicle dynamic sensors 112 may be included as part of a Controller Area Network (CAN) of the vehicle 102 and may be configured to provide vehicle dynamic data to the ECU 104 to be utilized for one or more vehicle systems, sub-systems, control systems, and the like. The vehicle dynamic sensors 112 may include, but may not be limited to, speed sensors, steering speed sensors, steering angle sensors, throttle angle sensors, accelerometers, magnetometers, gyroscopes, brake force sensors, wheel speed sensors, wheel turning angle sensors, yaw rate sensors, transmission gear sensors, temperature sensors, RPM sensors, GPS/DGPS sensors, and the like (individual sensors not shown).

In one configuration, the vehicle dynamic sensors 112 may provide one or more values (e.g., numeric levels) that are associated with the real-time dynamic performance of the vehicle 102 as one or more driving maneuvers are conducted and/or as the vehicle 102 is controlled to be autonomously driven. As described below, vehicle dynamic data that represents the current dynamic state of the vehicle 102 may be utilized by the vehicle control application 106 to be input to the secondary DNN structure 110 along with the intermediate representation of the surrounding environment of the vehicle, one or more applicable traffic laws, and one or more applicable vehicle maneuvers. The DNN(s) of the secondary DNN structure 110 may be configured to analyze a pre-trained dynamic control dataset (shown in FIG. 3) and output vehicle control commands to the vehicle control application 106 that may be utilized to autonomously control the vehicle 102.

Figure 2:
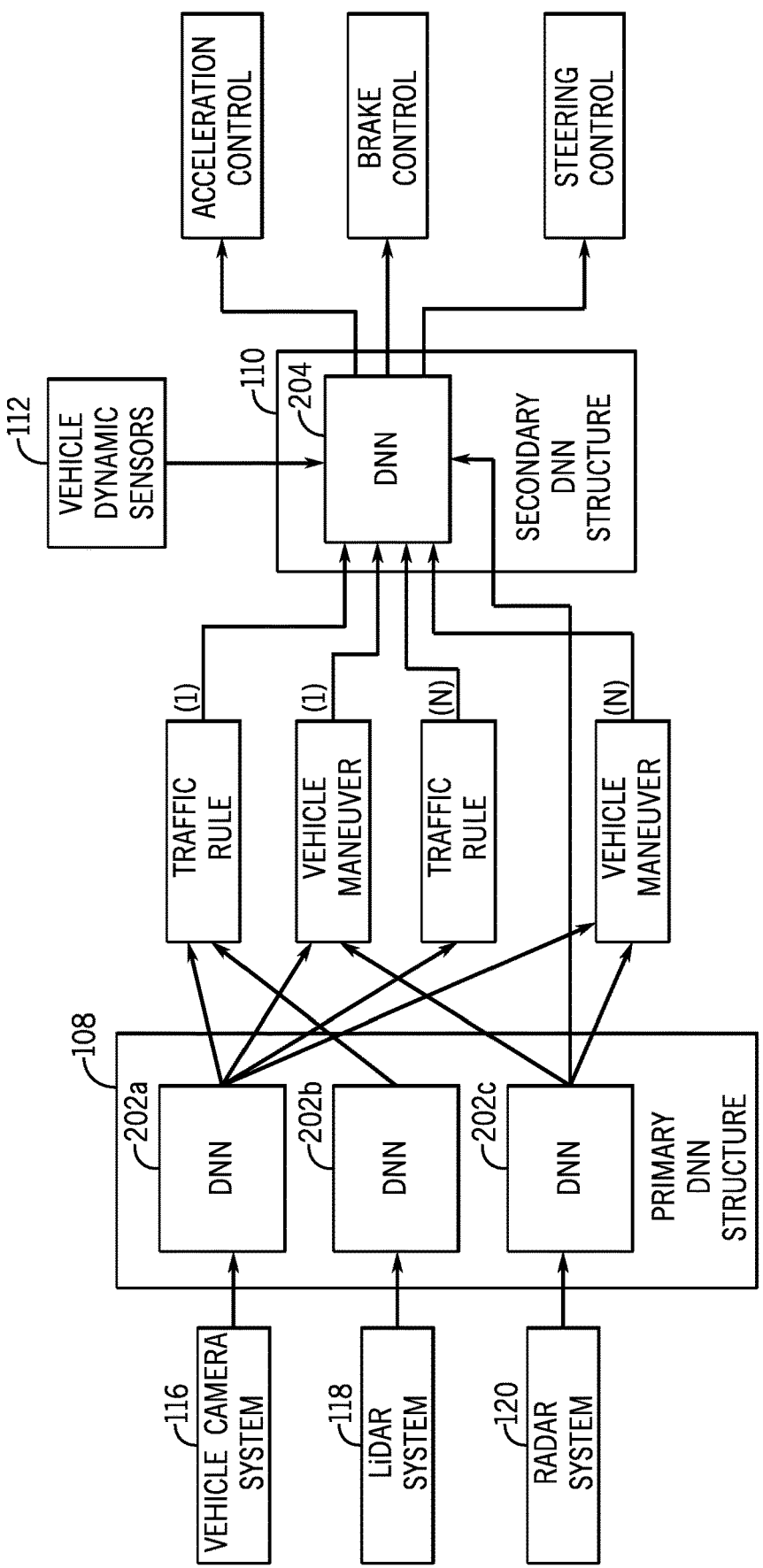
FIG. 2 is an illustrative example of a general data flow of the primary DNN structure and the secondary DNN structure according to an exemplary embodiment of the present disclosure.

FIG. 2 includes an illustrative example of a general data flow of the primary DNN structure 108 and the secondary DNN structure 110 according to an exemplary embodiment of the present disclosure. As shown in an illustrative example of FIG. 2, the primary DNN structure 108 may include respective DNNs 202a-202c. It is appreciated that the primary DNN structure 108 may include more or less number of DNNs than the DNNs 202a-202c shown in the illustrated example of FIG. 2. In one embodiment, the DNNs 202a-202c of the primary DNN structure 108 may be configured to receive data that is output by the vehicle camera system 116, the LiDAR system 118, and the radar system 120.

In particular, the vehicle camera system 116 may provide image data to the vehicle control application 106, the LiDAR system 118 may provide LiDAR data to the vehicle control application 106, and the radar system 120 may provide radar data to the vehicle control application 106. The vehicle control application 106 may be configured to provide the image data, the LiDAR data, and the radar data to be input to the primary DNN structure 108 to be respectively input to the respective DNNs 202a-202c for machine learning/deep learning analysis to be completed.

In one embodiment, the DNNs 202a-202c of the primary DNN structure 108 may be configured to evaluate and determine an intermediary representation of the surrounding environment of the vehicle, applicable traffic rules, and applicable vehicle maneuvers with respect to the vehicle 102 navigating within the surrounding environment of the vehicle 102. The secondary DNN structure 110 may be configured to receive inputs of the data output by the primary DNN structure 108 along with vehicle dynamic data provided by the vehicle dynamic sensors 112. As shown, in one configuration, the secondary DNN structure 110 may include a DNN 204 as shown in the illustrative example. However, it is appreciated that the secondary DNN structure 110 may include more than one DNN that may receive inputted data and perform machine learning/deep learning mathematical manipulations of inputs.

As shown in the illustrative example and discussed below, the DNN 204 of the secondary DNN structure 110 may be configured to evaluate pre-trained dynamic control data that may be stored on the storage unit 114 to output vehicle control commands to the application 106. As represented, such commands may include, but may not be limited to, acceleration control commands, brake control commands, and steering control commands that may be utilized by the vehicle control application 106 to autonomously control the vehicle 102 to safely and efficiently navigate within the surrounding environment of the vehicle 102 (and similar surrounding environments of the vehicle 102).

With reference again to FIG. 1, the primary DNN structure 108 and the secondary DNN structure 110 may be operably controlled by a neural network processing unit 128. The neural network processing unit 128 may be configured to execute various types of machine learning methods and/or deep learning methods that may be utilized to receive inputs, analyze the inputs, and output data. The neural network processing unit 128 may process one or more programming models which enables computer learning that is based on stored pre-trained datasets (discussed below with respect to FIG. 3) that are stored on the storage unit 114 and are accessible by the primary DNN structure 108 and the secondary DNN structure 110.

Figure 3:
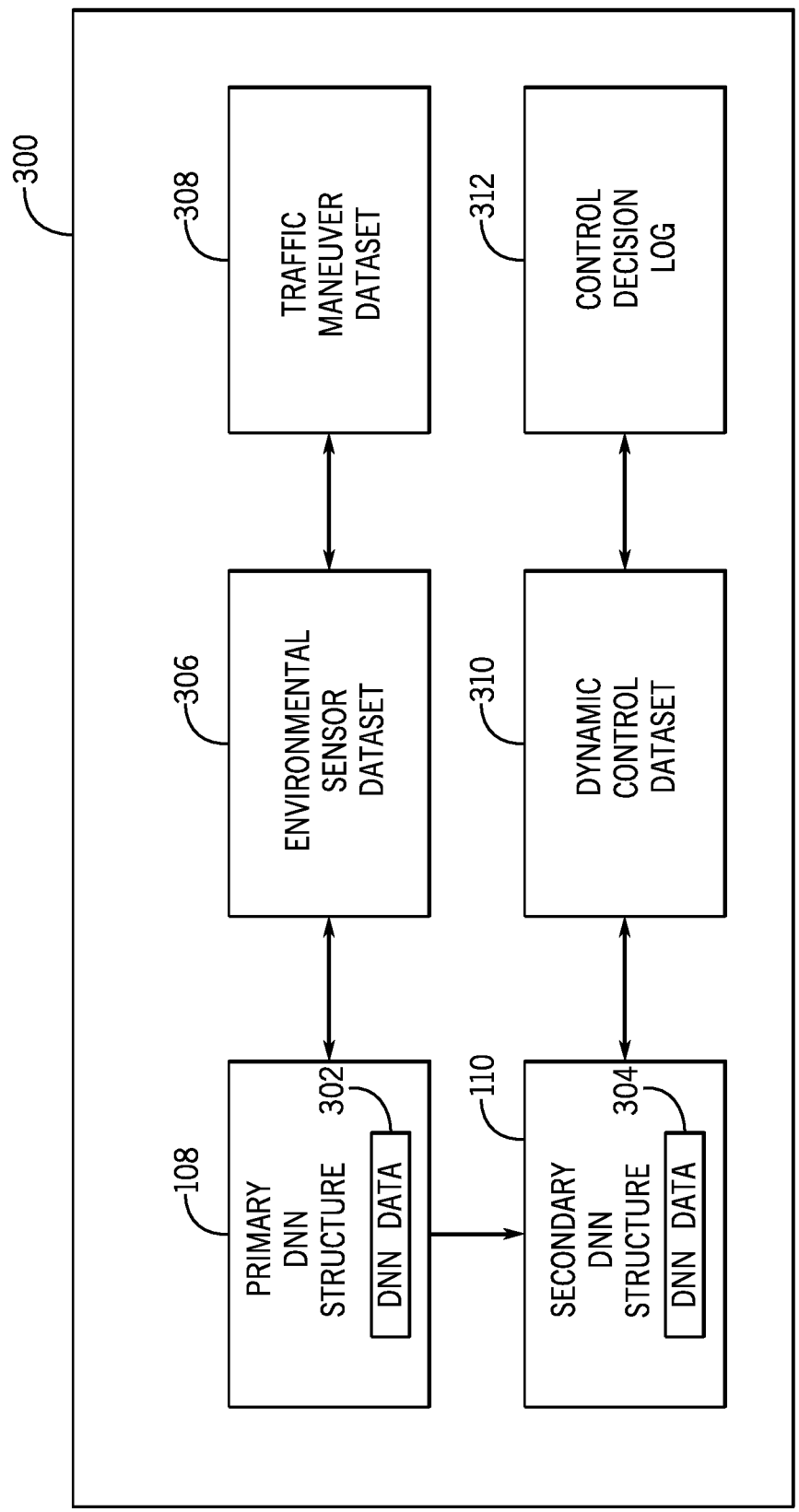
FIG. 3 is a schematic view of the neural network related data stored on a storage unit according to an exemplary embodiment of the present disclosure.

In an exemplary embodiment, the storage unit 114 may be configured to store neural network data that may include data associated with the primary DNN structure 108 and the secondary DNN structure 110. FIG. 3 includes a schematic view of the neural network related data 300 stored on the storage unit 114 according to an exemplary embodiment of the present disclosure. As represented in FIG. 3, the DNN data 302 associated with one or more DNNs of the primary DNN structure 108 may be stored on the storage unit 114. The DNN data 302 may include executable data that may be executed by the neural network processing unit 128 to operably control the DNN(s) of the primary DNN structure 108. The DNN data 302 may be executed to operate the DNN(s) to perform machine learning/deep learning mathematical manipulations of inputs to the primary DNN structure 108.

Similarly, DNN data 304 associated with one or more DNNs of the secondary DNN structure 110 may be stored on the storage unit 114. The DNN data 304 may include executable data that may be executed by the neural network processing unit 128 that may operably control the DNN(s) of the secondary DNN structure 110. The DNN data 304 may be executed to operate the DNN(s) to perform machine learning/deep learning mathematical manipulations of inputs to the the secondary DNN structure 110.

The DNN data 302 of the primary DNN structure 108 and the DNN data 304 of the secondary DNN structure 110 may include data associated with multiple layers of the respective DNNs. Accordingly, each of the DNNs of the primary DNN structure 108 and the secondary DNN structure 110 may include a respective input layer, a signal processing layer, a plurality of hidden layers (e.g., n hidden layers), and an output layer. In one or more embodiments, each of the layers may include perceptrons that may utilize machine learning/deep learning mathematical manipulations of inputs (e.g., sensor data, traffic rule data, maneuver guideline data, and vehicle dynamic data). For example, sensor data may be received by the one or more perceptrons of the input layer, processed by the one or more perceptrons of the signal processing layer, and mathematically manipulated by one or more perceptrons of the plurality of hidden layers that may be utilized to convert inputs using data that may be stored within a particular dataset (that was pre-trained) and sent to one or more perceptrons of the output layer to be output to the vehicle control application 106.

In one embodiment, the storage unit 114 may be configured to store pre-trained datasets that may be accessed and utilized by the primary DNN structure 108 and the secondary DNN structure 110. In one configuration, the pre-trained datasets may include an environmental sensor dataset 306, a traffic maneuver dataset 308, and a dynamic control dataset 310. In one embodiment, the environmental sensor dataset 306 may be configured as a pre-trained dataset that may be pre-trained by a third party entity (e.g., OEM) with image coordinate values, LiDAR coordinate values, and radar coordinate values that may be utilized to generate the intermediate representation of the surrounding environment of the vehicle 102.

In particular, the DNN(s) of the primary DNN structure 108 may be configured to analyze the image data, LiDAR data, and/or radar data received in the form of environmental sensor data inputs with respect to the environmental sensor dataset 306 to thereby determine a real-time intermediate (virtual) representation of the surrounding environment of the vehicle 102. The intermediate representation of the surrounding environment of the vehicle 102 may include data that pertains to a position of the vehicle 102 with respect to the traffic participants, roadway attributes, and road side objects located within the surrounding environment of the vehicle 102. The DNN(s) of the primary DNN structure 108 may be configured to output intermediate representation data that is associated with the real-time intermediate representation of the surrounding environment of the vehicle 102 to be further analyzed by the traffic maneuver dataset 308 stored on the storage unit 114.

As discussed below, the DNN(s) of the primary DNN structure 108 may be configured to evaluate the intermediate representation data against data pertaining to traffic rules and maneuver guidelines that may be applicable within the surrounding environment of the vehicle 102. In an exemplary embodiment, the traffic maneuver dataset 308 may be configured as a pre-trained dataset that may pre-trained by a third party entity (e.g., OEM, traffic entity) and/or may be updated via an external data connection (e.g., internet connection) between the vehicle 102 and one or more third party entities. The traffic maneuver dataset 308 may include traffic rules (e.g., jurisdictional traffic laws) that may apply various traffic scenarios. For example, the traffic rules may apply to traffic light status, road signage, road markings, speed limits, and the like that may apply to the to how the vehicle 102 is operated to navigate.

The traffic maneuver dataset 308 may additionally include maneuver guidelines that may include pre-trained guidelines associated with one or more vehicle maneuvers that may take place in one or more scenarios. The maneuver guidelines may include guidelines with respect to driving maneuvers that should be followed by the vehicle 102 based on the position and/or status of one or more traffic participants, one or more roadway attributes, and/or one or more road side objects located within the surrounding environment of the vehicle 102. As an illustrative example, one or more maneuver guidelines may apply to a pre-determined distance that should be maintained between the vehicle 102 and a curb as a right turn is made. As another illustrative example, one or more maneuver guidelines may apply how much distance from a bike lane should be maintained when there is a traffic participant biker located a certain distance ahead of the vehicle 102 and/or before an upcoming turn. The pre-trained traffic rules and the pre-trained maneuver guidelines included within the traffic maneuver dataset 308 may accordingly be analyzed by the primary DNN structure 108 to output traffic rule applicability data and vehicle maneuver applicability data.

The traffic rule applicability data may include one or more traffic rules (e.g., stop at red light, maintain speed at or below speed limit, stop and/or adjust path to allow emergency vehicles to pass) that may be applied to operate the vehicle 102 to be navigated within the surrounding environment of the vehicle 102. Additionally, the vehicle maneuver applicability data may include one or more vehicle maneuvers (e.g., stop to allow pedestrian to cross, maintain 3 feet distance from bike lane maker, maintain 4 feet distance with respect to another leading vehicle at or below a particular speed) that may be applied to operate the vehicle 102 to be navigated within the surrounding environment of the vehicle 102. As discussed below, the intermediate representation, traffic rule applicability data, and the traffic maneuver applicability output by the primary DNN structure 108 may be input to the secondary DNN structure 110 to be analyzed along with vehicle dynamic data provided by the vehicle dynamic sensors 112 against the dynamic control dataset 310 stored on the storage unit 114 of the vehicle 102.

In an exemplary embodiment, the dynamic control dataset 310 may be configured as a pre-trained dataset that may be pre-trained by a third party entity (e.g., OEM) and/or may be updated via an external data connection between the vehicle 102 and one or more third party entities. The dynamic control dataset 310 may include dynamic control parameters that may apply to one or more vehicle controls. In one configuration, the dynamic control dataset 310 may include dynamic control parameters that may apply to, but may not be limited to, acceleration controls, brake controls, and steering controls. Each of the controls may pertain to specific values (e.g., levels) of acceleration, braking/deceleration, steering angles that may be utilized based on the current vehicle dynamics of the vehicle 102 and on one or more traffic rules and/or vehicle maneuvers that are applicable, as inputted to the secondary DNN structure 110 in the form of the traffic maneuver data.

As discussed below, the DNN(s) of the secondary DNN structure 110 may be configured to analyze the dynamic control dataset 310 with respect data inputted from the primary DNN structure 108 to determine one or more vehicle dynamic controls. As represented in the illustrative example of FIG. 2, the one or more vehicle dynamic controls may be provided in the form of acceleration control(s), brake control(s), and/or steering control(s) to the vehicle control application 106.

With continued reference to FIGS. 1 and 3, in one or more embodiments, the storage unit 114 of the vehicle 102 may be configured to additionally store a control decision log 312 that is part of the neural network related data 300. In one embodiment, the control decision log 312 may be configured as a data log that may be populated by the vehicle control application 106 with data that is outputted by the primary DNN structure 108 and the secondary DNN structure 110.

In one embodiment, the vehicle control application 106 may be configured to access the control decision log 312 to output an explainable model that may provide context (e.g., explanations) as to a reason why particular autonomous driving decisions may be utilized. In some embodiments, the application 106 may be configured to access the control decision log 312 and predict one or more trajectories of the vehicle 102 and/or additional traffic participants. In yet some additional embodiments, the application 106 may be configured to utilize data stored on the control decision log 312 to the environmental sensor dataset 306, the traffic maneuver dataset 308, and/or the dynamic control dataset 310 to train the primary DNN structure 108 and/or the secondary DNN structure 110 based on one or more traffic scenarios that may be faced by the vehicle 102 within the surrounding environment of the vehicle 102.

The Vehicle Control Application and Related Methods

The components of the vehicle control application 106 will now be described according to an exemplary embodiment and with reference to FIGS. 1-3. In an exemplary embodiment, the vehicle control application 106 may be stored on the storage unit 114 and executed by the ECU 104 of the vehicle 102. In another embodiment, the vehicle control application 106 may be stored on an externally hosted computing infrastructure (not shown) (e.g., external server) and may be accessed by the ECU 104 (through a communication system) to be executed.

The generally functionality of the vehicle control application 106 will now be discussed. In an exemplary embodiment, the vehicle control application 106 may include a data reception module 130, a data input/output module 132, and a vehicle control module 134. However, it is to be appreciated that the vehicle control application 106 may include one or more additional modules and/or sub-modules that are included in addition to the modules 130-134. Methods and examples describing process steps that are executed by the modules 130-134 of the vehicle control application 106 will now be described in more detail.

Figure 4:
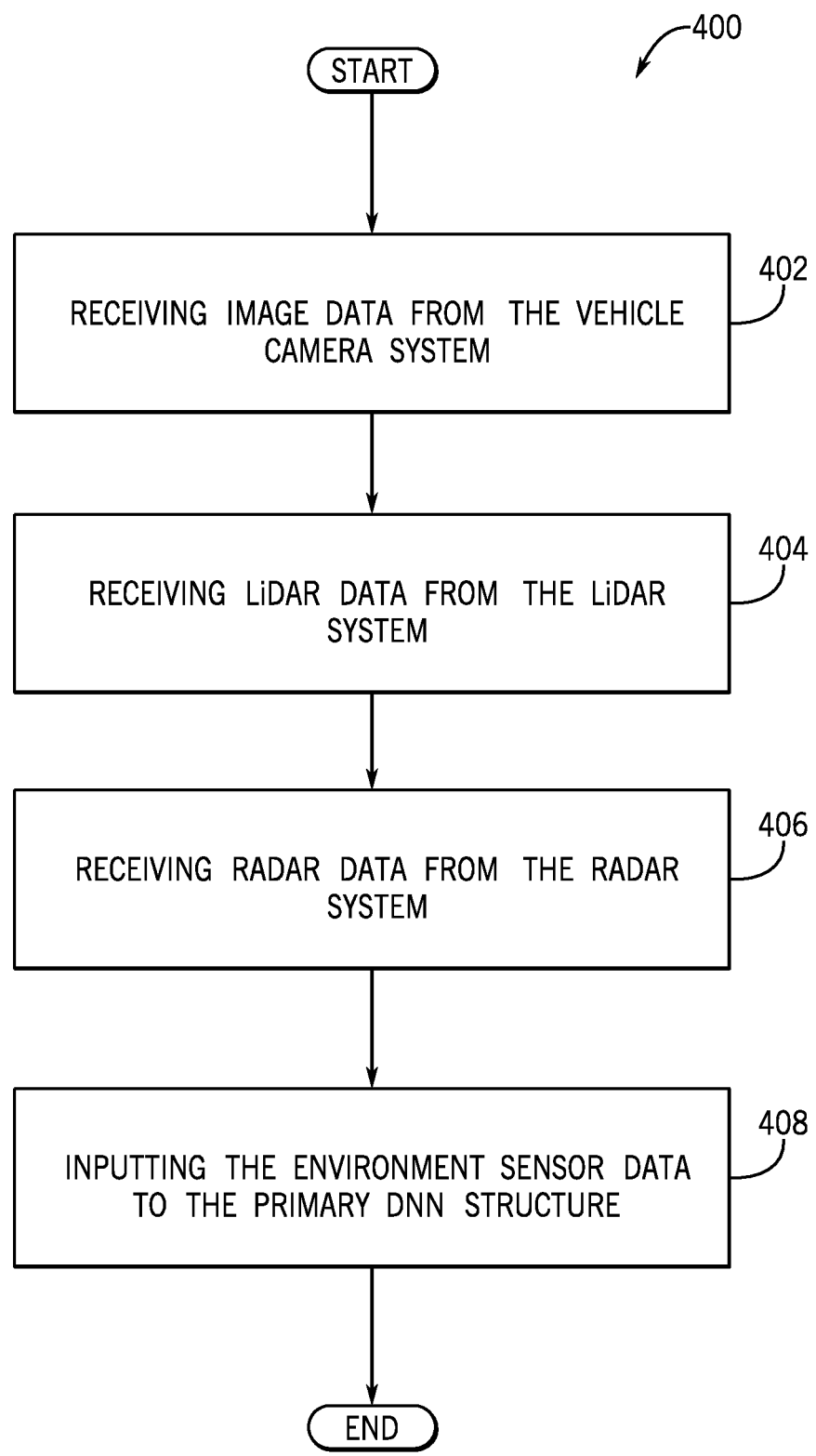
FIG. 4 is a process flow diagram of a method for receiving environmental sensor data from at least one sensor of the vehicle of the surrounding environment of the vehicle according to an exemplary embodiment of the present disclosure.

FIG. 4 is a process flow diagram of a method 400 for receiving environmental sensor data from at least one sensor of the vehicle 102 of the surrounding environment of the vehicle 102 according to an exemplary embodiment of the present disclosure. FIG. 4 will be described with reference to the components of FIG. 1, FIG. 2, and FIG. 3, though it is to be appreciated that the method 400 of FIG. 4 may be used with other systems/components. The method 400 may begin at block 402, wherein the method 400 may include receiving image data from the vehicle camera system 116.

In an exemplary embodiment, the data reception module 130 of the vehicle control application 106 may be configured to communicate with the vehicle camera system 116 to receive image data based on untrimmed images/video captured by the one or more cameras 122 of the surrounding environment of the vehicle 102. As discussed, the vehicle camera system 116 may be configured to convert the images/ video into image data that may include one or more attributes including one or more sets of image coordinates that may be associated with one or more traffic participants (e.g., pedestrians, bikers, other vehicles), one or more roadway attributes (e.g., lane markings, off-ramps, curbs), and one or more road side objects (e.g., traffic light, stop sign) located within the surrounding environment of the vehicle 102. Upon converting the images/videos into the image data, the vehicle camera system 116 may communicate the image data to the data reception module 130 of the vehicle control application 106.

The method 400 may proceed to block 404, wherein the method 400 may include receiving LiDAR data from the LiDAR system. In an exemplary embodiment, the data reception module 130 may also be configured to communicate with the LiDAR system 118 of the vehicle 102 to receive LiDAR data based on one or more reflected laser waves by the LiDAR transceiver(s) 124. As discussed, the LiDAR system 118 may be configured to convert reflected laser beam measurements into LiDAR data that may include one or more sets of LiDAR coordinates that may be associated with a position, location, and depth of one or more traffic participants, one or more roadway attributes, and/or one or more road side objects located within the surrounding environment of the vehicle 102. Upon converting the reflected laser beam measurements into the LiDAR data, the LiDAR system 118 may be configured to communicate the LiDAR data to the data reception module 130 of the vehicle control application 106.

The method 400 may proceed to block 406, wherein the method 400 may include receiving radar data from the radar system. In an exemplary embodiment, the data reception module 130 may be additionally configured to communicate with the radar system of the vehicle 102 to receive radar data based on one or more reflected radar waves by the radar transceiver(s) 126. As discussed, the radar system 120 may be configured to convert reflected radar wave measurements into radar data that may include one or more sets of radar coordinates that may be associated with a position, location, and depth of one or more traffic participants, one or more roadway attributes, and/or one or more road side objects located within the surrounding environment of the vehicle 102. Upon converting the reflected radar wave measurements into the radar data, the radar system 120 may be configured to communicate the radar data to the data reception module 130 of the vehicle control application 106.

The method 400 may proceed to block 408, wherein the method 400 may include inputting the environment sensor data to the primary DNN structure 108. In one or more embodiments, upon receiving the image data, the LiDAR data, and the radar data (at blocks 402-406), the data reception module 130 may communicate respective data to the data input/output module 132 of the vehicle control application 106. In one embodiment, the data input/output module 130 may be configured to communicate with the neural network processing unit 128 to communicate data to be inputted to the primary DNN structure 108 and/or the secondary DNN structure 110.

Additionally, the data input/output module 132 may be configured to communicate with the neural network processing unit 128 to receive data that is outputted by the primary DNN structure 108 and/or the secondary DNN structure 110. As discussed, data output by the primary DNN structure 108 and/or the secondary DNN structure 110 may be communicated to the vehicle control module 134 and/or to the neural network processing unit 128 to be processed by the primary DNN structure 108 and/or the secondary DNN structure 110 and/or stored within the neural network related data 300 on the storage unit 114.

In an exemplary embodiment, the data input/output module 132 may be configured to communicate the image data, the LiDAR data, and/or the radar data to the neural network processing unit 128 to be inputted to the primary DNN structure 108. In one configuration, upon being inputted to the primary DNN structure 108, one or more respective DNN(s) of the primary DNN structure 108 may respectively receive respective types of environmental data to be processed. For example, as represented in the illustrative example of FIG. 2, the DNN 202*a* may receive image data provided from the vehicle camera system 116, the DNN 202*b* may receive LiDAR data provided from the LiDAR system 118, and the DNN 202*c* may receive radar data provided from the radar system 120.

FIG. 5 is a process flow diagram of a method 500 for inputting the environmental sensor data to a primary deep neural network structure 108 and outputting at least one applicable traffic rule and at least one applicable vehicle maneuver that may be followed while navigating within the surrounding environment of the vehicle 102 according to an exemplary embodiment of the present disclosure. FIG. 5 will be described with reference to the components of FIG. 1, FIG. 2, and FIG. 3, though it is to be appreciated that the method 500 of FIG. 5 may be used with other systems/components. The method 500 may begin at block 502, wherein the method 500 may include processing the environmental sensor data.

In an exemplary embodiment, upon receiving the environmental sensor data as inputs to the primary DNN structure 108, the one or more DNN(s) of the primary DNN structure 108 may be configured process the image data, LiDAR data, and radar data into metrics that may be compared against the environmental sensor dataset 306. In other words, the signals inputted to the primary DNN structure 108 may be processed by respective digital signal processing layers of respective DNN's to process the image data, LiDAR data, and radar data into metrics that may be evaluated with respect to the pre-trained environmental sensor data included within the environmental sensor dataset 306.

The method 500 may proceed to block 504, wherein the method 500 may include utilizing machine learning/deep learning to output intermediate representation data associated with the surrounding environment of the vehicle 102. In an exemplary embodiment, upon processing the environmental sensor data, the DNN(s) of the primary DNN structure 108 may be configured to access the environmental sensor dataset 306 to analyze the processed metrics associated with the image data, the LiDAR data, and the radar data with respect to the pre-trained environmental sensor data of the environmental sensor dataset 306.

In particular, the DNN(s) of the primary DNN structure 108 may be configured to utilize machine learning/deep learning processes to analyze the processed metrics associated with the environmental sensor inputs with respect to the environmental sensor dataset 306 to thereby determine a real-time virtual representation of the surrounding environment of the vehicle 102. The real-time virtual representation of the surrounding environment of the vehicle 102 may include data that pertains to a position of the vehicle 102 with respect to the traffic participants, roadway attributes, and road side objects located within the surrounding environment of the vehicle 102. The primary DNN structure 108 may be configured to output the intermediate representation data that is associated with the real-time intermediate (e.g., virtual) representation of the surrounding environment of the vehicle 102.

In one embodiment, upon the output of the intermediate representation data by the DNN(s) of the primary DNN structure 108, the neural network processing unit 128 may communicate the intermediate representation data to the data input/output module 132. The data input/output module 132 may be configured to access the control decision log 312 on the storage unit 114 of the vehicle 102. Upon accessing the control decision log 312, the data input/output module 132 may be configured to store the intermediate representation data on the control decision log 312. In some configurations, the vehicle control application 106 may be configured to access the control decision log 312 to output an explainable model that may provide context as to a reason why one or more autonomous vehicle controls may be applied with respect to the vehicle 102 based on the position of the vehicle 102 with respect to the traffic participants, roadway attributes, and road side objects located within the surrounding environment of the vehicle 102.

The method 500 may proceed to block 506, wherein the method 500 may include utilizing machine learning/deep learning to output traffic rule applicability data and vehicle maneuver applicability data. In an exemplary embodiment, upon outputting the intermediate representation data, the DNN(s) of the primary DNN structure 108 may be configured to access the traffic maneuver dataset 308. In one configuration, the DNN(s) of the primary DNN structure 108 may be configured to evaluate the intermediate representation data against data pertaining to one or more traffic rules and maneuver guidelines that may be applicable within the surrounding environment of the vehicle 102 and stored as pre-trained data within the traffic maneuver dataset 308.

As discussed, the traffic maneuver dataset 308 may include traffic rules (e.g., jurisdictional traffic laws) that may apply to various traffic scenarios. The traffic rules may be followed and utilized to operate the vehicle 102 within the surrounding environment of the vehicle 102 in a manner that adheres to one or more applicable traffic rules. Additionally, the traffic maneuver dataset 308 may include one or more maneuver guidelines that may include pre-trained guidelines associated with one or more vehicle maneuvers that may apply to various traffic scenarios. The one or more maneuver guidelines may include guidelines with respect to driving maneuvers that should be followed by the vehicle 102 based on the position and/or status of one or more traffic participants, roadway attributes, and/or road side objects located within the surrounding environment of the vehicle 102.

In one embodiment, the DNN(s) of the primary DNN structure 108 may utilize machine learning/deep learning processes to analyze the traffic maneuver dataset 308. Upon analyzing the traffic maneuver dataset 308, the primary DNN structure 108 may determine one or more traffic rules that may be applicable and may not be applicable to the specific traffic scenario that may be faced by the vehicle 102 within the surrounding environment of the vehicle 102. Similarly, the primary DNN structure 108 may determine one or more vehicle maneuvers that may be applicable and may not be applicable to the specific traffic scenario that may be faced by the vehicle 102 within the surrounding environment of the vehicle 102.

In one or more embodiments, the DNN(s) of the primary DNN structure 108 may accordingly output traffic rule applicability data and traffic maneuver applicability data. In one embodiment, the neural network processing unit 128 may be configured to communicate the traffic rule applicability data and the traffic maneuver applicability to the data input/output module 132 of the vehicle control application 106. The data input/output module 132 may be configured to access the control decision log 312 on the storage unit 114 of the vehicle 102. Upon accessing the control decision log 312, the data input/output module 132 may be configured to store the traffic rule applicability data and the vehicle maneuver applicability data on the control decision log 312. In some configurations, the vehicle control application 106 may be configured to access the control decision log 312 to output an explainable model that may explain traffic rules that may be applicable or not applicable within certain traffic scenarios. Additionally, the explainable model may be output to explain vehicle maneuvers that may be applicable or not applicable within certain traffic scenarios. The applicability of traffic rules and/or vehicle maneuvers may provide context as to the reason why one or more autonomous vehicle controls may be applied within one or more traffic scenarios that may be faced by the vehicle 102 within the surrounding environment of the vehicle 102.

The method 500 may proceed to block 508, wherein the method 500 may include inputting the intermediate representation data, the traffic rule applicability data, and the traffic maneuver applicability data to the secondary DNN structure 110. In an exemplary embodiment, the neural network processing unit 128 may be configured to input the intermediate representation data, the traffic rule applicability data, and the traffic maneuver applicability data output from the DNN(s) of the primary DNN structure 108 to the secondary DNN structure 110. In one embodiment, upon receiving the outputs from the primary DNN structure 108, the DNN(s) of the secondary DNN structure may be configured process the intermediate representation data, traffic rule applicability data, and the vehicle maneuver applicability data into metrics that may be compared against the dynamic control dataset 310 along with vehicle dynamic data as discussed below.

FIG. 6 is a process flow diagram for inputting the intermediate representation, at least one applicable traffic rule, and at least one applicable vehicle maneuver to a secondary deep neural network structure 110 and outputting vehicle dynamic controls to autonomously control the vehicle 102 according to an exemplary embodiment of the present disclosure. FIG. 6 will be described with reference to the components of FIG. 1, FIG. 2, and FIG. 3, though it is to be appreciated that the method 600 of FIG. 6 may be used with other systems/components. The method 600 may begin at block 602, wherein the method 600 may include receiving vehicle dynamic data from the vehicle dynamic sensors 112.

In an exemplary embodiment, the data reception module 130 of the vehicle control application 106 may be configured to communicate with the vehicle dynamic sensors 112 to receive vehicle dynamic data sensed by the sensors 112. As discussed, the vehicle dynamic sensors 112 may provide one or more values (e.g., numeric levels) that are associated with the real-time dynamic performance of the vehicle 102 as one or more driving maneuvers are conducted and/or as the vehicle 102 is controlled to be autonomously driven.

The method 600 may proceed to block 604, wherein the method 600 may include inputting vehicle dynamic data to the secondary DNN structure 110. In one embodiment, the data reception module 130 may be configured to communicate the vehicle dynamic data that represents a current dynamic state of the vehicle 102 to the data input/output module 132. Upon receipt of the vehicle dynamic data, the data input/output module 132 may communicate with the neural network processing unit 128 to input the vehicle dynamic data to the secondary DNN structure 110. Accordingly, the vehicle dynamic data may be inputted to the DNN(s) of the secondary DNN structure 110 to be analyzed in addition to the intermediate representation data, the traffic rule applicability data, and the vehicle maneuver applicability data output by the primary DNN structure 108.

In an exemplary embodiment, upon receiving the vehicle dynamic data as an input to the secondary DNN structure 110, the one or more DNN(s) of the secondary DNN structure 110 may be configured to process the vehicle dynamic data into metrics that may be compared against the dynamic control dataset. In other words, the signals inputted to the secondary DNN structure 110 may be processed by respective digital signal processing layers of the DNN(s) to process the vehicle dynamic data into metrics that may be evaluated with respect to the pre-trained vehicle dynamic controls included within the dynamic control dataset 310.

The method 600 may proceed to block 606, wherein the method 600 may include utilizing machine learning/deep learning to output vehicle dynamic controls. In an exemplary embodiment, the DNN(s) of the secondary DNN structure 110 may be configured to access the dynamic control dataset 310 to analyze the processed metrics associated with the intermediate representation of the surrounding environment of the vehicle 102, the applicable traffic rule(s), the applicable vehicle maneuver(s), and the current dynamic state of the vehicle 102.

In particular, the DNN(s) of the secondary DNN structure 110 may be configured to utilize machine learning/deep learning processes to analyze the processed metrics with respect to the dynamic control dataset 310 to thereby determine vehicle dynamic controls that may be output by the secondary DNN structure 110. As discussed above, the dynamic control dataset 310 may be configured as a pre-trained dataset that includes dynamic control parameters that may apply to one or more vehicle controls. In one configuration, the dynamic control dataset 310 may include dynamic control parameters that may apply to, but may not be limited to, acceleration control, brake controls, and steering controls. Each of the controls may pertain to specific values (e.g., levels) of acceleration, braking/deceleration, steering angles that may be utilized based on the current vehicle dynamics of the vehicle 102, the intermediate (virtual) representation of the surrounding environment of the vehicle 102, one or more applicable traffic rules, and/or one or more applicable vehicle maneuvers.

In an exemplary embodiment, the DNN(s) of the secondary DNN structure 110 may be configured to analyze the dynamic control dataset 310 to determine dynamic control parameters that may be applied to operate the vehicle 102 to be navigated in accordance with one or more applicable traffic rules and one or more applicable vehicle maneuvers as output by the primary DNN structure 108. In one embodiment, the DNN(s) of the secondary DNN structure 110 may accordingly output vehicle dynamic controls (in the form of various types of dynamic controls) that may be applied to control the vehicle 102 to navigate within the surrounding environment of the vehicle 102 based on the applicable traffic rule(s) and/or the applicable vehicle maneuver(s).

As shown in the illustrative example of FIG. 2, the DNN 204 of the secondary DNN structure 110 may output vehicle dynamic controls in form of at least one acceleration control, at least one brake control, and at least one steering control. The acceleration control(s) may include one or more values (e.g., levels) that may pertain to an amount of acceleration that may be applied (to speed up the vehicle 102 from a current vehicle speed) to navigate in a particular (e.g., current) traffic scenario based on the position of the vehicle 102 with respect to the traffic participants, roadway attributes, and road side objects located within the surrounding environment of the vehicle 102, applicable traffic rule(s), and the applicable vehicle maneuver(s).

The brake control(s) may include one or more values that may pertain to an amount of braking/deceleration that may be applied (to slow down or stop the vehicle 102 from a current vehicle speed) to navigate in the particular traffic scenario based on the position of the vehicle 102 with respect to the traffic participants, roadway attributes, and road side objects located within the surrounding environment of the vehicle 102, applicable traffic rule(s), and the applicable vehicle maneuver(s). Additionally, the steering control(s) may include one or more values that may pertain to one or more steering angles that may be applied (to turn the vehicle 102 from a current trajectory to a different trajectory) to navigate in the particular traffic scenario based on the position of the vehicle 102 with respect to the traffic participants, roadway attributes, and road side objects located within the surrounding environment of the vehicle 102, applicable traffic rule(s), and the applicable vehicle maneuver(s).

In one or more embodiments, upon the secondary DNN structure 110 outputting vehicle dynamic controls, the neural network processing unit 128 may communicate data pertaining to the vehicle dynamic controls to the data input/output module 132. The data input/output module 132 may be configured to access the control decision log 312 on the storage unit 114 of the vehicle 102. Upon accessing the control decision log 312, the data input/output module 132 may be configured to store data pertaining to the vehicle dynamic controls on the control decision log 312. In some configurations, the vehicle control application 106 may be configured to access the control decision log 312 to output an explainable model that may be evaluated with the intermediate representation data, traffic rule applicability data, and vehicle maneuver applicability data, that may provide context (e.g., explanations) as to a reason why one or more autonomous driving decisions that have been utilized to apply the vehicle dynamic controls.

Referring again to FIG. 6, the method 600 may proceed to block 608, wherein the method 600 may include evaluating the vehicle dynamic controls to autonomously control the operation of the vehicle 102. In one embodiment, the data input/output module 132 may be configured to communicate data pertaining to the vehicle dynamic controls output by the secondary DNN structure 110 to the vehicle control module 134 of the vehicle control application 106.

In an exemplary embodiment, the vehicle control module 134 may be configured to evaluate the vehicle dynamic controls output by the secondary DNN structure 110 to extract the values (levels) of particular vehicle controls that may be applied to autonomously control the vehicle 102. For example, the vehicle control module 134 may be configured to evaluate the vehicle dynamic controls to determine one or more values that pertain to one or more levels of acceleration, braking, and one or more angles of steering that may be applied to autonomously control the vehicle 102 to navigate within the surrounding environment of the vehicle 102.

The method 600 may proceed to block 610, wherein the method 600 may include communicating with the ECU 104 to autonomously control the vehicle 102 to navigate within the surrounding environment of the vehicle 102 based on the applicable traffic rule(s) and the applicable vehicle maneuver(s). In an exemplary embodiment, upon evaluating the vehicle dynamic controls output by the secondary DNN structure 110, the vehicle control module 138 may communicate with the ECU 104 of the vehicle 102 to autonomously control the vehicle 102 to be autonomously (or semi-autonomously) operated (e.g., driven) within the surrounding environment of the vehicle 102 in accordance with one or more applicable traffic rules and one or more applicable vehicle maneuvers (output by the primary DNN structure 108). In particular, the ECU 104 may communicate with one or more of the respective systems/control units (not shown) to thereby control the vehicle 102 to be operated using one or more levels of acceleration, braking, and one or more angles of steering that may be applied to autonomously control the vehicle 102 based on the one or more vehicle dynamic controls to navigate the vehicle 102 in a safe and efficient manner within the surrounding environment of the vehicle 102.

Figure 7:
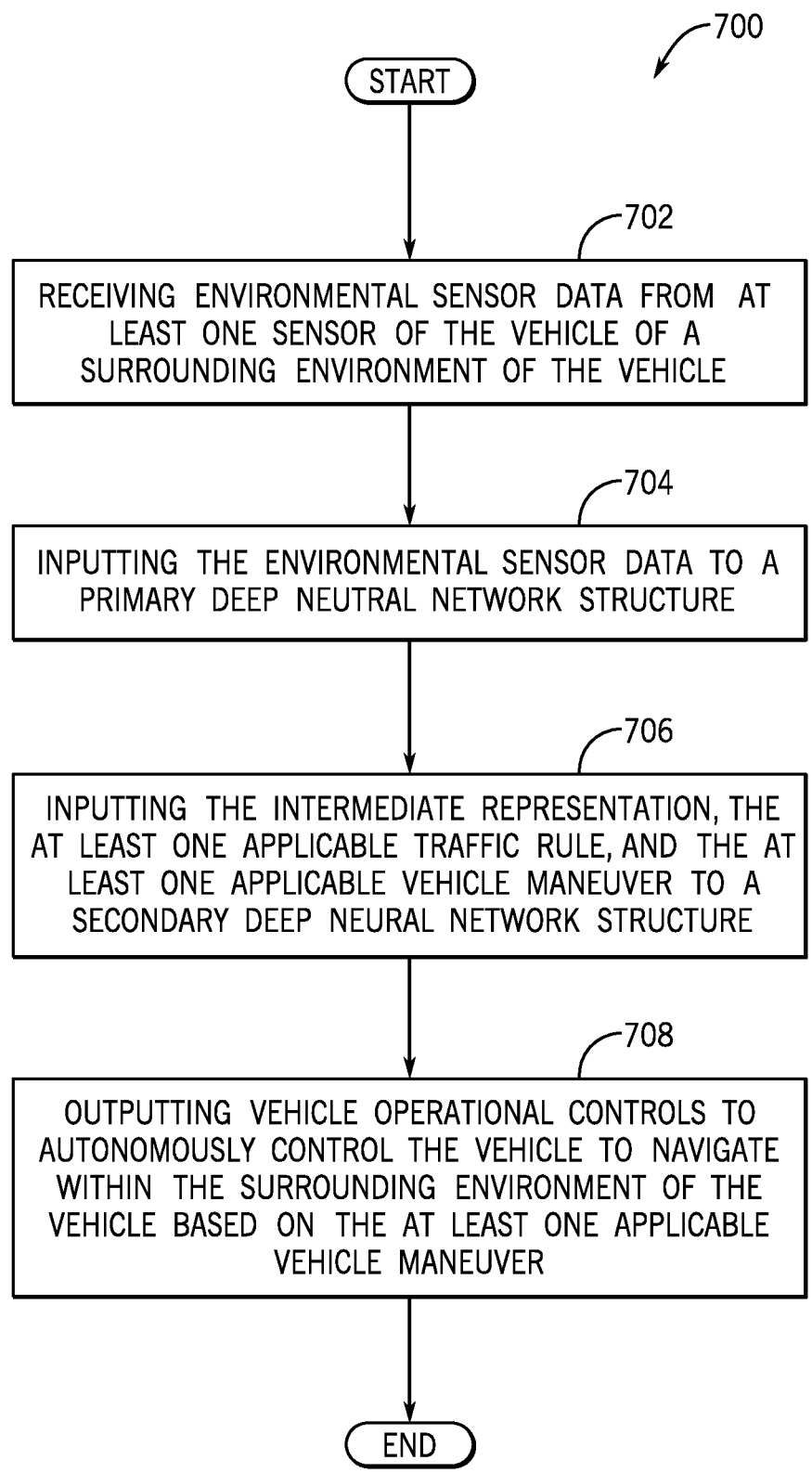
FIG. 7 is a process flow diagram of a method for outputting vehicle dynamic controls using deep neural networks according to an exemplary embodiment of the present disclosure.

FIG. 7 is a process flow diagram of a method 700 for outputting vehicle dynamic controls using deep neural networks according to an exemplary embodiment of the present disclosure. FIG. 7 will be described with reference to the components of FIG. 1, FIG. 2, and FIG. 3, though it is to be appreciated that the method 700 of FIG. 7 may be used with other systems/components. The method 700 may begin at block 702, wherein the method 700 may include receiving environmental sensor data from at least one sensor of the vehicle of a surrounding environment of the vehicle 102.

The method 700 may proceed to block 704, wherein the method 700 may include inputting the environmental sensor data to a primary deep neural network structure 108. In one embodiment, the primary deep neural network structure 108 includes at least one deep neural network that outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle.

The method 700 may proceed to block 706, wherein the method 700 may include inputting the intermediate representation, the at least one applicable traffic rule, and the at least one applicable vehicle maneuver to a secondary deep neural network structure. The method 700 may proceed to block 708, wherein the method 700 may include outputting vehicle operation controls to autonomously control the vehicle to navigate within the surrounding environment of the vehicle based on the at least one applicable traffic rule and the at least one applicable vehicle maneuver.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for outputting vehicle dynamic controls using deep neural networks, comprising:
receiving environmental sensor data from at least one sensor of a vehicle of a surrounding environment of the vehicle;
inputting the environmental sensor data to a primary deep neural network structure (primary DNN structure), wherein the primary DNN structure outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle;
inputting the intermediate representation, the at least one applicable traffic rule, and the at least one applicable vehicle maneuver to a secondary deep neural network structure (secondary DNN structure); and
outputting vehicle dynamic controls from the secondary DNN structure to autonomously control the vehicle to navigate within the surrounding environment of the vehicle based on the at least one applicable traffic rule and the at least one applicable vehicle maneuver.

2. The computer-implemented method of claim 1, wherein data output by the primary DNN structure and the secondary DNN structure are stored on a control decision log, wherein the control decision log is accessed to output an explainable model that includes explanations as to particular autonomous driving decisions that are utilized to apply the vehicle dynamic controls.

3. The computer-implemented method of claim 1, wherein vehicle dynamic data is received from vehicle dynamic sensors of the vehicle, wherein the vehicle dynamic data is inputted to the secondary DNN structure to be evaluated in addition to the intermediate representation, the at least one applicable traffic rule, and the at least one applicable vehicle maneuver output by the primary DNN structure.

4. The computer-implemented method of claim 3, wherein the vehicle dynamic data, the intermediate representation, the at least one applicable traffic rule, and the at least one applicable vehicle maneuver is evaluated with respect to a pre-trained dynamic control dataset to output the vehicle dynamic controls.

5. The computer-implemented method of claim 4, wherein the vehicle dynamic controls includes at least one acceleration control, at least one brake control, and at least one steering control, wherein the at least one acceleration control, the at least one brake control, and the at least one steering control are utilized to autonomously control the vehicle to navigate within the surrounding environment of the vehicle.

6. The computer-implemented method of claim 1, wherein receiving environmental sensor data includes receiving image data, LiDAR data, and radar data, wherein the image data, the LiDAR data, and the radar data includes image coordinates, LiDAR coordinates, and radar coordinates that are associated with at least one traffic participant, at least one roadway attribute, and at least one road side object.

7. The computer-implemented method of claim 6, wherein the primary deep neural network structure utilizes a pre-trained environmental sensor dataset that includes image logic, LiDAR logic, and radar logic, wherein the image data, the LiDAR data, and the radar data is evaluated with respect to the pre-trained environmental sensor dataset to output the intermediate representation of the surrounding environment of the vehicle.

8. The computer-implemented method of claim 7, wherein the intermediate representation of the surrounding environment of the vehicle is evaluated with respect to a pre-trained traffic maneuver dataset to output the at least one traffic rule that is applicable to the operation of the vehicle within the surrounding environment of the vehicle.

9. The computer-implemented method of claim 7, wherein the intermediate representation of the surrounding environment of the vehicle is evaluated with respect to a pre-trained traffic maneuver dataset to output the at least one vehicle maneuver that is applicable to the operation of the vehicle within the surrounding environment of the vehicle.

10. A system for outputting vehicle dynamic controls using deep neural networks, comprising:
a memory storing instructions when executed by a processor cause the processor to:
receive environmental sensor data from at least one sensor of a vehicle of a surrounding environment of the vehicle;
input the environmental sensor data to a primary deep neural network structure (primary DNN structure), wherein the primary DNN structure outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle;
input the intermediate representation, the at least one applicable traffic rule, and the at least one applicable vehicle maneuver to a secondary deep neural network structure (secondary DNN structure); and
output vehicle dynamic controls from the secondary DNN structure to autonomously control the vehicle to navigate within the surrounding environment of the vehicle based on the at least one applicable traffic rule and the at least one applicable vehicle maneuver.

11. The system of claim 10, wherein data output by the primary DNN structure and the secondary DNN structure are stored on a control decision log, wherein the control decision log is accessed to output an explainable model that includes explanations as to particular autonomous driving decisions that are utilized to apply the vehicle dynamic controls.

12. The system of claim 10, wherein receiving environmental sensor data includes receiving image data, LiDAR data, and radar data, wherein the image data, the LiDAR data, and the radar data includes image coordinates, LiDAR coordinates, and radar coordinates that are associated with at least one traffic participant, at least one roadway attribute, and at least one road side object.

13. The system of claim 12, wherein the primary deep neural network structure utilizes a pre-trained environmental sensor dataset that includes image logic, LiDAR logic, and radar logic, wherein the image data, the LiDAR data, and the radar data is evaluated with respect to the pre-trained environmental sensor dataset to output the intermediate representation of the surrounding environment of the vehicle.

14. The system of claim 13, wherein the intermediate representation of the surrounding environment of the vehicle is evaluated with respect to a pre-trained traffic maneuver dataset to output the at least one traffic rule that is applicable to the operation of the vehicle within the surrounding environment of the vehicle.

15. The system of claim 13, wherein the intermediate representation of the surrounding environment of the vehicle is evaluated with respect to a pre-trained traffic maneuver dataset to output the at least one vehicle maneuver that is applicable to the operation of the vehicle within the surrounding environment of the vehicle.

16. The system of claim 10, wherein vehicle dynamic data is received from vehicle dynamic sensors of the vehicle, wherein the vehicle dynamic data is inputted to the secondary DNN structure to be evaluated in addition to the intermediate representation, the at least one applicable traffic rule, and the at least one applicable vehicle maneuver output by the primary DNN structure.

17. The system of claim 16, wherein the vehicle dynamic data, the intermediate representation, the at least one applicable traffic rule, and the at least one applicable vehicle maneuver is evaluated with respect to a pre-trained dynamic control dataset to output the vehicle dynamic controls.

18. The system of claim 17, wherein the vehicle dynamic controls includes at least one acceleration control, at least one brake control, and at least one steering control, wherein the at least one acceleration control, the at least one brake control, and the at least one steering control are utilized to autonomously control the vehicle to navigate within the surrounding environment of the vehicle.

19. A non-transitory computer readable storage medium storing instructions that when executed by a computer, which includes a processor perform a method, the method comprising:
receiving environmental sensor data from at least one sensor of a vehicle of a surrounding environment of the vehicle;
inputting the environmental sensor data to a primary deep neural network structure (primary DNN structure), wherein the primary DNN structure outputs an intermediate representation of the surrounding environment of the vehicle, at least one applicable traffic rule to be followed while navigating within the surrounding environment of the vehicle, and at least one applicable vehicle maneuver to be followed while navigating within the surrounding environment of the vehicle;
inputting the intermediate representation, the at least one applicable traffic rule, and the at least one applicable vehicle maneuver to a secondary deep neural network structure (secondary DNN structure); and
outputting vehicle dynamic controls from the secondary DNN structure to autonomously control the vehicle to navigate within the surrounding environment of the vehicle based on the at least one applicable traffic rule and the at least one applicable vehicle maneuver.

20. The non-transitory computer readable storage medium of claim 19, wherein data output by the primary DNN structure and the secondary DNN structure are stored on a control decision log, wherein the control decision log is accessed to output an explainable model that includes explanations as to particular autonomous driving decisions that are utilized to apply the vehicle dynamic controls.

* * * * *